United States Patent
Rojas Fonseca (10) Patent No.: US 10,824,443 B1
(45) Date of Patent: Nov. 3, 2020

(54) STATE MACHINE COMMUNICATION

(71) Applicant: HEWLETT PACKARD ENTERPRISE DEVELOPMENT LP, Houston, TX (US)

(72) Inventor: Francisco Jose Rojas Fonseca, Heredia (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/576,418

(22) Filed: Sep. 19, 2019

(51) Int. Cl.
*G06F 9/448* (2018.01)
*G06F 9/38* (2018.01)
*G06F 9/30* (2018.01)
*G06F 9/445* (2018.01)

(52) U.S. Cl.
CPC ........ *G06F 9/4498* (2018.02); *G06F 9/30003* (2013.01); *G06F 9/3881* (2013.01); *G06F 9/44505* (2013.01)

(58) Field of Classification Search
CPC .............. G06F 9/4498; G06F 9/30003; G06F 9/44505; G06F 9/3881; G06F 15/78
See application file for complete search history.

(56) References Cited

U.S. PATENT DOCUMENTS

| | | |
|---|---|---|
| 8,132,043 B2 | 3/2012 | Dash et al. |
| 9,032,133 B2 | 5/2015 | Schmidt et al. |
| 9,086,688 B2 | 7/2015 | Law et al. |
| 10,592,296 B2 * | 3/2020 | Fitzpatrick ............ G06F 9/5083 |
| 2009/0328069 A1 * | 12/2009 | Lala ........................ G06F 9/542 |
| | | 719/318 |
| 2013/0311495 A1 * | 11/2013 | Rossi ..................... G06F 16/951 |
| | | 707/758 |
| 2018/0321952 A1 * | 11/2018 | Rougier ................ G06F 9/4498 |
| 2019/0004824 A1 | 1/2019 | Aronov et al. |

OTHER PUBLICATIONS

Elkorobarrutia, X. el al., "A Self-Healing Mechanism for State Machine Based Components," ICUC, 2006, http://citeseerx.ist.psu.edu/viewdoc/download?doi=10.1.1.88.9537&rep=rep1&type=pdf.
Torenbeek, R., "An Introduction to Building Collaborative Finite-State Machines with DDS," Sep. 10, 2012, https://www.rti.com/blog/2012/09/10/an-introduction-to-building-collaborative-finite-state-machines-with-dds/.

* cited by examiner

*Primary Examiner* — Daniel D Chang
(74) *Attorney, Agent, or Firm* — Hewlett Packard Enterprise Patent Department (57) ABSTRACT

Examples disclosed herein relate to a method comprising determining, by a control state machine running on a control module, a state for a plurality of modules communicatively coupled to the control module, wherein each module has a corresponding state machine that publishes state information into a centralized database. The method may include publishing, by the control state machine, the target state for each module in the plurality of modules, into the centralized database, wherein each target state is associated with a set of actions to enable the module to achieve the target state. The method may also include determining, by the control state machine, that each module in the plurality of modules has published its new state to the database and initializing, by the control state machine, a process related to at least one module in the plurality of modules.

20 Claims, 7 Drawing Sheets

STATE MACHINE COMMUNICATION

BACKGROUND

Booting a modular system, a modular chassis switch, inserting new modules or performing a HA failover when the management module fails may require coordination between all the modules.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Aspects of the present disclosure use a centralized database and performs boot, hot swap and failover coordination using state published in the DB. It uses a hybrid approach where each module in the system is responsible for its own operations and a central process that arbitrates the state of all modules to decide what's the next step.

All the different contributors in the system individually publish their state in the centralized DB, without having to communicate between each other. When the central arbiter determines that all the different states required to move forward are ready, it sets the state of each module. Each module just listens the arbiter's state and based on it, moves to the next set of operations.

Given this central coordination of modules' state, it is possible to model boot, hot swap and failover as a set of state machines pairs, one pair per module, where one instance runs in the centralized arbiter and the other on the module itself. The machine's states represent the set of operations that each module must perform on each stage when booting the system, inserting or removing a module or doing a failover process.

The state of each state machine pair is published directly in the DB, which provides a higher level of visibility of the overall system state when it is in one of its transient phases. This visibility enhances supportability as it provides more information of each module's and the overall system's state. This can be leveraged to trigger alarms to perform actions based on specific module's states.

This mechanism allows for a step locking of the initialization/failover phases without direct interaction between modules, so that the next step for any participant module is only taken when the system is ready for it.

A method for state machine communication may include determining, by a control state machine running on a control module, a state for a plurality of modules communicatively coupled to the control module, wherein each module has a corresponding state machine that publishes state information into a centralized database. The method may include publishing, by the control state machine, the target state for each module in the plurality of modules, into the centralized database, wherein each target state is associated with a set of actions to enable the module to achieve the target state. The method may also include determining, by the control state machine, that each module in the plurality of modules has published its new state to the database and initializing, by the control state machine, a process related to at least one module in the plurality of modules.

Figure 1A:
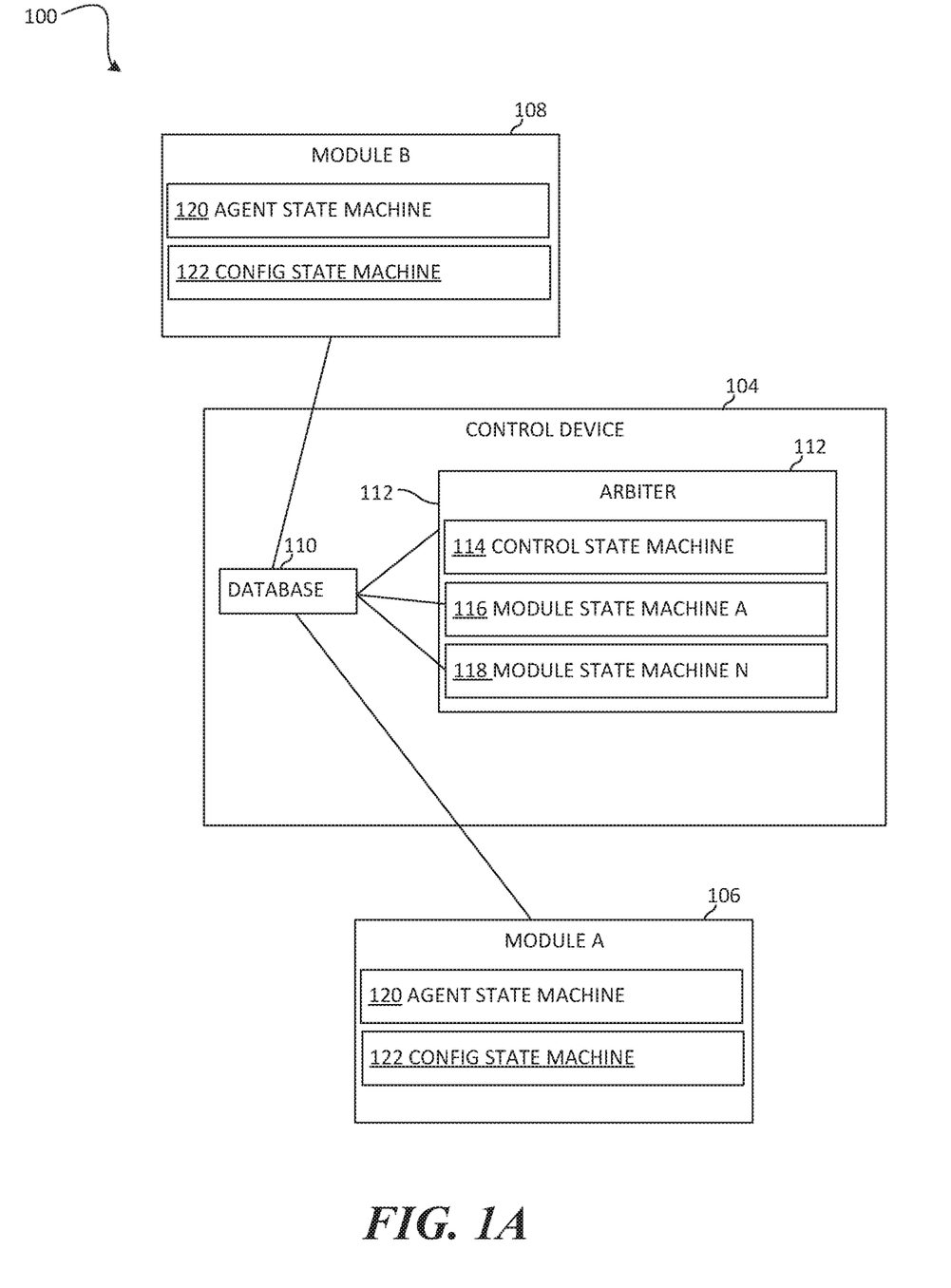
FIG. 1A is a block diagram of an example system for using state machine communication.
Figure 1B:
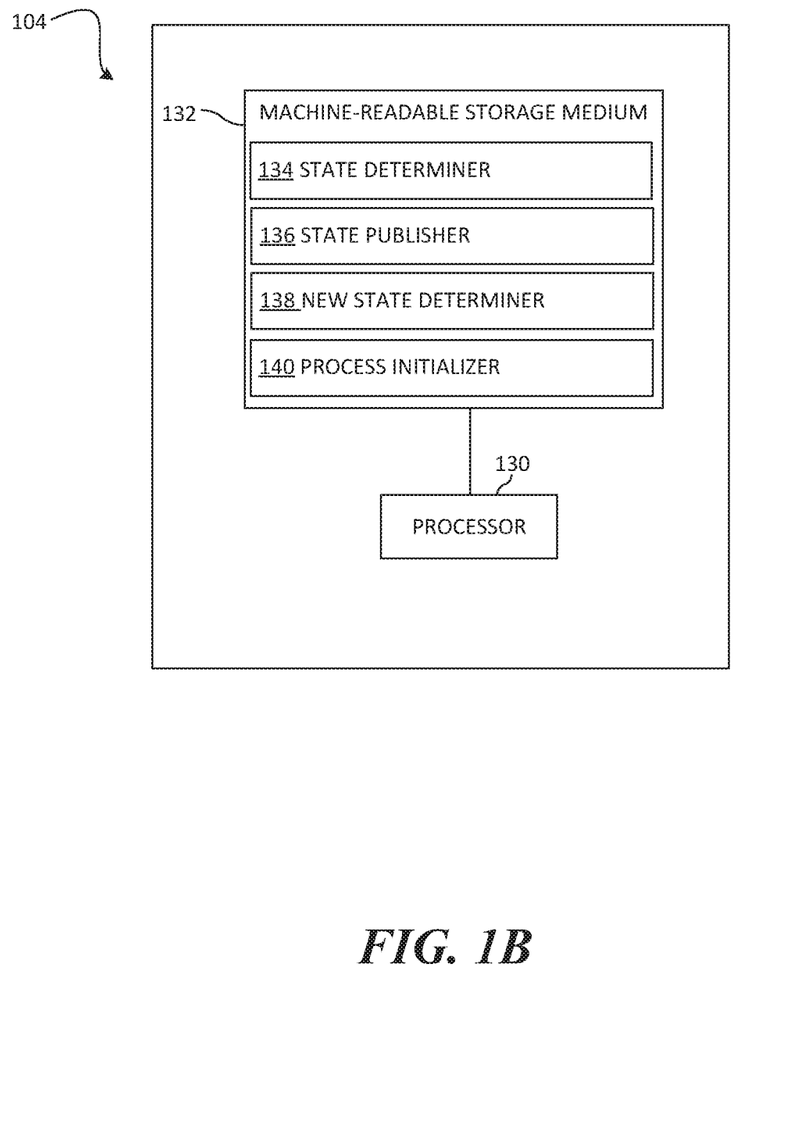
FIG. 1B is a block diagram of another example system for using state machine communication.

FIG. 1 is a block diagram of an example system 100 where state machine communication may be used. The state machine may be part of a data plane setup engine, which is used in networking devices to configure the device's data planes based on the user configuration or network state. The system 100 may include a network having a control device 104 and a plurality of modules including, for example, module A 106 and module N 108. Although only two modules are shown in system 100, this is for explanatory purposes only and any number of modules may be used in system 100.

In some aspects, control device 104 may be a dedicated centralized controller that is part of a network device. In some aspects, control device 104 may be one of the plurality of modules and system 100 does not have a dedicated control device 104. The control module may include a central CPU where the state and full control of the system is. This central CPU may be called an active CPU or a commander CPU, among other things. The dataplanes of the system may be distributed in multiple CPUs, where each CPU has full control of the dataplane itself. A dataplane is the part of a network that carries user traffic.

Each of the modules 106 and 108 and control device 104 may be any number of network devices. For example, a network device may be a network switch. A switch may be a device within a network that forwards data sent by a sender device toward a recipient device (or multiple recipient devices). In some examples, a network device includes a layer 2 switch that forwards data packets (also referred to as data frames or data units) based on layer 2 addresses in the data packets. Examples of layer 2 addresses include Medium Access Control (MAC) addresses. In alternative examples, a switch includes a layer 3 router that forwards data packets based on layer 3 addresses, such as Internet Protocol (IP) addresses in the data packets.

A "packet" or "data packet" can refer to any unit of data that can be conveyed over a network. A packet or data packet may also refer to a frame or data frame, a data unit, a protocol data unit, and so forth. A switch forwards data (in data packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

Control device 104 may include or otherwise be connected to a database 110. The database may be a state based database 110 used for configuring the modules 106, 108 and/or other devices on the network. A database 110 may store some or all of the configuration, status, states and statistics of the network 102, the control device 104, the modules 106, and 108 and/or other devices on the network 102 at any given point at time. The different state data may be accessed from the database 110 either individually (data for a given time, a given device, etc.) or in aggregate (data aggregated for particular items over a given time period, etc.). In other words, the state of the switch may be retrieved from any arbitrary state to any other arbitrary state by manipulating the database. Accordingly, the various configurations and states of devices in the system 100 are stored and can be accessed by other devices in the system. In this manner, devices in the system 100 can indirectly communicate with each other and synchronize data throughout the system.

In the field of network computing, network connectivity between devices, compute nodes, blades, or frames of a scalable compute resource may be implemented using a network communication device. Network communication devices, such as switches, routers, hubs, bridges, etc. represent a primary communication path for sharing data between different types of compute resources generically referred to as "nodes" of a network. The shared data may represent inputs to compute processes (e.g., data or applications), outputs of compute resources (e.g., compute results), communications to coordinate distributed processes, communications between users, and other types of data. In any "intelligent" network communication device, there may be a processor, local memory, configuration information, and "current state" information, among other types of information. Collectively, the different types of information on a network device may be considered to represent the overall "device state" at a given point in time. For example, information on a network communication device (including its "device state") is expected to change over time, in part, because while in-service and providing active communication paths for a network, the overall configuration and available devices on that network may change.

The control device may monitor any network state of the device on which it is executing by listening on state changes (e.g., event generation) on the central internal database of the device (e.g., network communication device). This central internal database (and information exchange with that database) is sometimes referred to as an extended Open vSwitch Database Management Protocol (OVSDB). As used in this example, "listening on state changes" generally refers to a technique for event generation that may be used in some implementations. In one example, a listen on state change means that nothing will happen as long as the state (e.g., database value) is not changed. Upon change, however, an activity will be initiated by whatever process is "registered to listen" for that change.

The control module may include an arbiter 112 which may monitor the state of each other device in the system. The arbiter is an intermediary that uses state of the system and all participating modules to take decisions and arbitrate the state of each participant must be in, this arbitration creates a N to 1 dependency, instead of a more complex N to N dependency where each participant would have to take its own decision. After determining the state of each other device in the system and determining that each other device in the system has entered a new state and performed the actions associated with that state, the arbiter 112 may continue the sequence of initializing the process. The arbiter may also include a plurality of state machines including a control state machine 114, a module state machine A 116 and a module state machine N 118.

The control state machine 114 is run for the global state of the dataplane in the System 100. This control state machine 114 is used to determine what it should be doing based on the aggregation of the state of the management module or member it is running and the state of all the dataplanes in the system. The control state machine 114 may control the state of the arbiter and be used to determine which device in the system 100 becomes the control device.

The module state machines 116, 118 control the lifecycle of its correspondent module. Each module state machine is associated with a subsystem row in the database 110 and it is driven mostly from inputs coming from that row. However, it can also take input from other tables, like the redundant management or internal triggers like timeouts or events from other subsystems. The states, actions and transitions are described below.

There may be one module state machine for each module connected to the control device. In aspects where the control device is one of the modules, arbiter 112 may also include a control device state machine. Each of the state machines 112-116 may be connected to the database 110.

Each of the modules 106 and 108 may include an agent state machine 120 and a config state machine 122. In some aspects, the arbiter 112 may include a config state machine 122 for each module in addition to or instead of the config state machine on each module. The agent state machine 120 provides a pluggable framework where any feature running in the agent can subscribe callbacks that get invoked when the agent reaches or leaves the correspondent state. The config state machine 122 coordinates synchronizing the global state to the new dataplane and clean up after the dataplane is removed.

Control device 104 may include a processor 130 and a machine-readable storage medium 132 that may be coupled to each other through a communication link (e.g., a bus). Processor 130 may include a single or multiple Central Processing Units (CPU) or another suitable hardware processor(s), such as a network ASIC. Machine-readable storage medium 132 may store machine readable instructions may be executed by processor 130. Machine-readable storage medium 132 may include any suitable combination of volatile and/or non-volatile memory, such as combinations of Random Access Memory (RAM), Read-Only Memory (ROM), flash memory, and/or other suitable memory.

Machine-readable storage medium 132 stores instructions to be executed by processor 130 including instructions for state determiner 134, state publisher 136, new state determiner 138 and process initializer 140.

Processor 130 may execute state determiner 134 to determine by a control state machine running on a control module, a state for a plurality of modules communicatively coupled to the control module. In some aspects, the control state machine runs on a centralized controller does not belong to the plurality of modules. In some aspects, the control state machine runs on a first module belongs to the plurality of modules. Each module may have a corresponding state machine that publishes state information into a centralized database.

Processor 130 may execute state publisher 136 to publish, by the control state machine, the target state for each module belonging to the plurality of modules, into the centralized database, wherein each target state is associated with a set of actions to enable the module to achieve the target state. Publishing the target state for a first module belonging to the plurality of modules may be used to indicate that the first module has finished its portion of a configuration sequence. The method may also include determining, by the control state machine, a state of a first module belonging to the plurality of modules, by determining the state of the first module published to the database, wherein the control state machine does not directly communicate with the first module.

Processor 130 may execute new state determiner 138 to determine by the control state machine, that each module belonging to the plurality of modules has published its new state to the database.

Processor 130 may execute process initializer 140 to initialize, by the control state machine, a process related to at least one module belonging to the plurality of modules. The process may be, for example, connecting a first dataplane of a first module belonging to the plurality of modules to a dataplane of each other module belonging to the plurality of modules. The processes may include changing a device from a standby mode to an active mode, hardware configuration, communication configuration, rebooting the system, inserting new hardware/software, etc.

In some aspects, the processor 130 may execute state determiner 134 to determine, by the control state machine of the first module, that an initial control state machine executing on a second module belonging to the plurality of modules has disconnected from the plurality of modules and determining, by the control state machine, that the control state machine of the first module is to become the control state machine for the plurality of modules.

Figure 2:
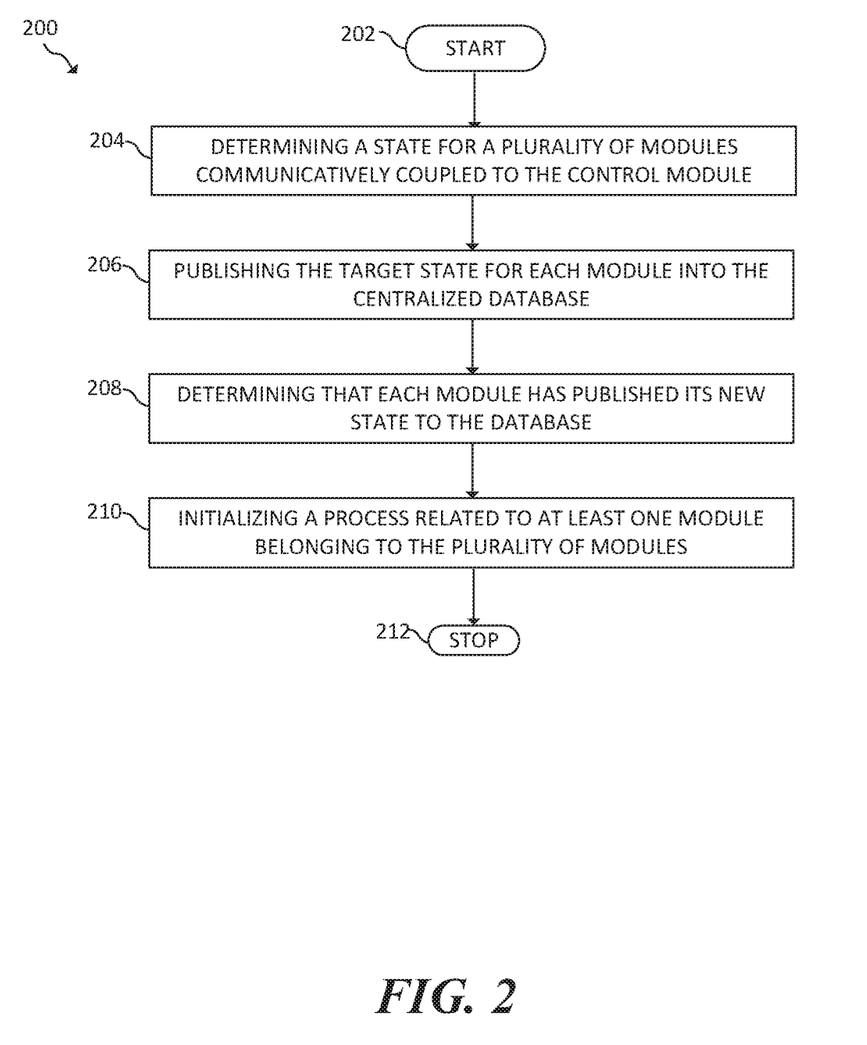
FIG. 2 is a flow diagram of an example method for using state machine communication.

FIG. 2 is a flow diagram of a method 200 for initialization using state machine communication. The system where method 200 is performed may be similar to system 100 described above. Accordingly, parts of and/or the entire method may be performed by one or more of the devices belonging to system 100 including, control state machine 114, agent state machine 120, config state machine 122, arbiter 112, module state machine A 116, module state machine N 118, etc.

The method 200 may begin at block 202 and proceed to block 204, where the method may include determining, by a control state machine running on a control module, a state for a plurality of modules communicatively coupled to the control module. In some aspects, the control state machine runs on a centralized controller does not belong to the plurality of modules. In some aspects, the control state machine runs on a first module belongs to the plurality of modules. Each module may have a corresponding state machine that publishes state information into a centralized database.

At block 206, the method may include publishing, by the control state machine, the target state for each module belonging to the plurality of modules, into the centralized database, wherein each target state is associated with a set of actions to enable the module to achieve the target state. Publishing the target state for a first module belonging to the plurality of modules may be used to indicate that the first module has finished its portion of a configuration sequence. The method may also include determining, by the control state machine, a state of a first module belonging to the plurality of modules, by determining the state of the first module published to the database, wherein the control state machine does not directly communicate with the first module.

At block 208, the method may include determining, by the control state machine, that each module belonging to the plurality of modules has published its new state to the database. At block 210, the method may include Initializing, by the control state machine, a process related to at least one module belonging to the plurality of modules. The process may be, for example, connecting a first dataplane of a first module belonging to the plurality of modules to a dataplane of each other module belonging to the plurality of modules. The processes may include changing a device from a standby mode to an active mode, hardware configuration, communication configuration, rebooting the system, inserting new hardware/software, etc. The method may proceed to block 210, where the method may end.

In some aspects, the method 200 may also include determining, by the control state machine of the first module, that an initial control state machine executing on a second module belonging to the plurality of modules has disconnected from the plurality of modules and determining, by the control state machine, that the control state machine of the first module is to become the control state machine for the plurality of modules. In some aspects, these steps may precede/run at a similar time as the beginning of the method 200, and the method 200 may be used to initiate a new control state machine. In some aspects, these steps may follow/run at a similar time as the beginning of the method 200, and the method 200 may be used to initiate a new control state machine.

Figure 3:
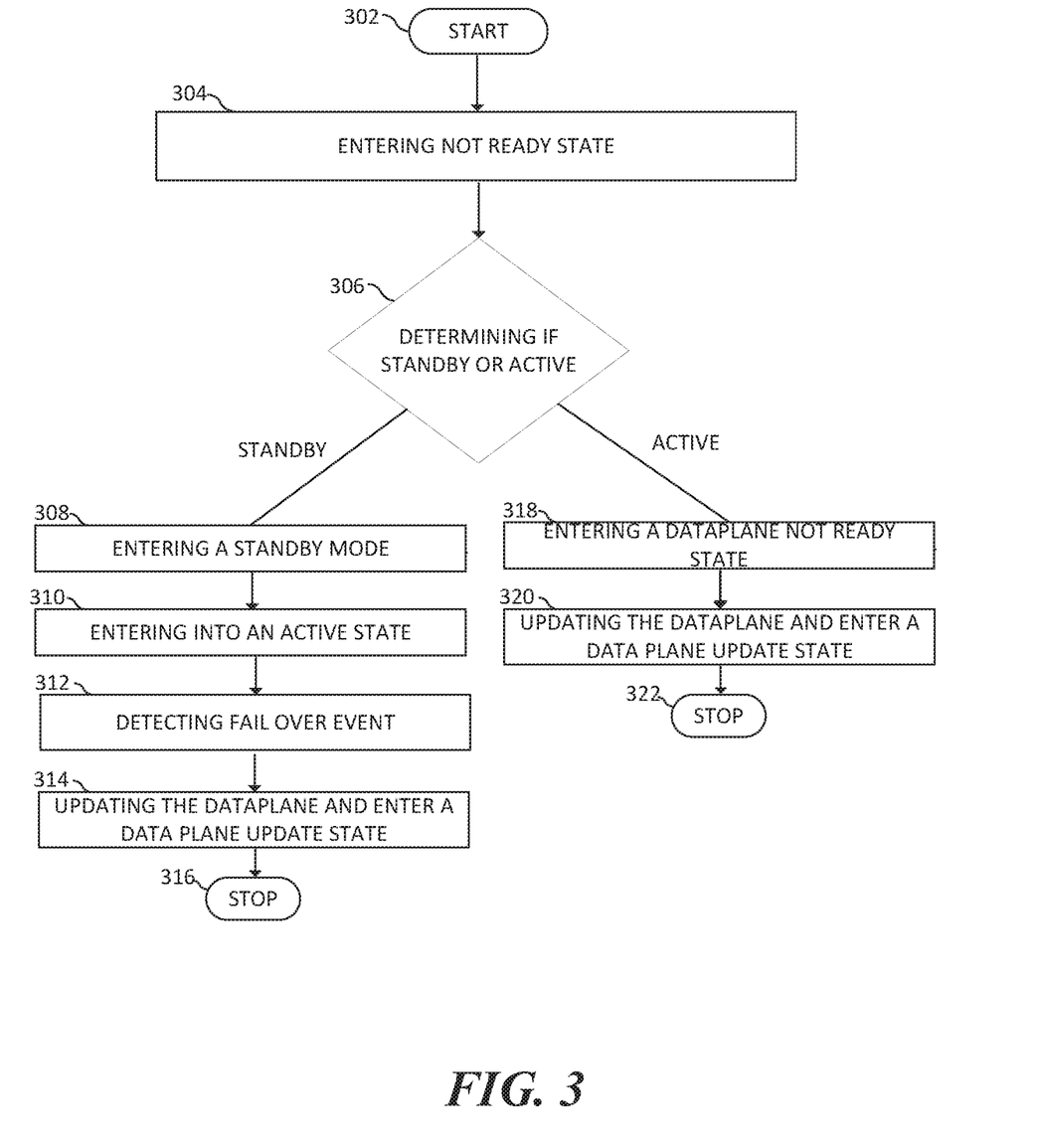
FIG. 3 is a flow diagram of another example method for using state machine communication.

FIG. 3 is a flow diagram of a method 300 for initialization using state machine communication. The system where method 300 is performed may be similar to system 100 described above. Accordingly, parts of and/or the entire method may be performed by, for example, the control state machine 114. The control state machine 114 may be part of a control device running an instance of a Dataplane Setup Engine (DPSE). The method 300 describes the actions performed in determining which device in the system is to become the control device. The system may have a primary control device that is in an active state as well as one or more secondary control devices in a standby state. One of the control devices in the standby state may take over for the primary control device in the event that the primary control device has a failover event. A failover event may include a system crash, a loss of communication between the primary control device and other devices in the system, a system reboot, etc.

The method also includes many of the state changes that the control state machine may make while performing these actions. Each time that the control state machine changes its state, it may write the change and/or update its state in a centralized database, such as the database 110 described above.

The method 300 may begin at block 302 and proceed to block 304 where the method may include determining that the control state machine is in an unknown state. When the system is booting, config is still being loaded, or election is still running, or there isn't enough information to determine the actions to be performed, the control state machine is kept in this state. The method may proceed to block 306, where the method may include determining whether the DPSE instance running on the same process of the control state machine is standby or active.

If it is determined that the DPSE instance is a standby (STANDBY branch of block 306), the method may proceed to block 308, where the method may include entering a standby mode. While in this state, the cache of the system is updated, but no other actions may be taken. During this state the control state machine may be available in the case of a failover event. The method may proceed to block 310, where the method may include detecting a fail over event. At block 312, the method may include entering into an active state. When a failover event is detected and the CPU where the DPSE instance is running becomes active, the control state machine of that CPU may enter the active state. Once at least one dataplane is on its Steady State or all dataplanes have finished their failover operations, the control state machine is moved to the active state. At block 314, the method may include updating the dataplane and entering a data plane update state. Updating the dataplane may include inserting or removing the dataplane. The method may proceed to block 316, where the method may end.

If it is determined that the DPSE instance is active, (ACTIVE branch of block 306), the method may proceed to block 318, where the method may include entering a dataplane not ready mode. The control state machine may remain in this mode until it determines that a dataplane is ready to be updated. The method may proceed to block 320, where the method may include updating the dataplane and entering a data plane update state. Updating the dataplane may include inserting or removing the dataplane. The method may proceed to block 322, where the method may end.

Figure 4:
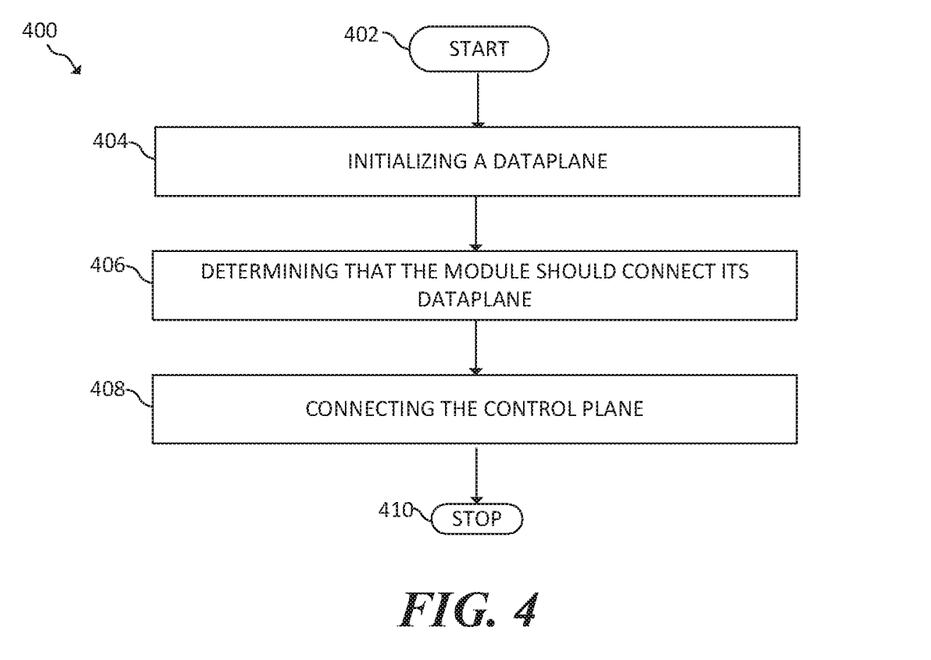
FIG. 4 is a flow diagram of another example method for using state machine communication.

FIG. 4 is a flow diagram of a method 400 for initialization using state machine communication. The system where method 400 is performed may be similar to system 100 described above. Accordingly, parts of and/or the entire method may be performed by, for example, one or more of the module state machines, such as module state machine A 116 and/or module state machine N 118. The method 400 describes the actions performed by the module state machine when configuring its corresponding module. Each time that the module state machine changes its state during its process, it may write the change and/or update its state in the database. As described above, the module state machine runs as part of the arbiter of the control device. The arbiter maintains a state machine corresponding to each module in the system in order to be aware of the state of that state machine. The arbiter may also periodically check to make sure that the state of the corresponding module in the module state machine matches the state of the module in the agent state machine. The module state machine may be part of module in communication with a control device running an instance of a Dataplane Setup Engine (DPSE). As described above, in some aspects, the module itself may be the control device.

The method may begin at block 402 and may proceed to block 404 where the method may include initializing a dataplane of the corresponding module. The agent state machine may begin in an absent state, where DPSE has not started the initialization process of the dataplane. This may be the initial state of the agent state machine. When DPSE detects that the dataplane is up and all the required information to initialize it is ready, then it stimulates the agent state machine to start. the initialization of the dataplane.

The method may proceed to block 406, where the method may include determining that the corresponding module should connect its dataplane to other dataplanes in the system. According, the module state machine may enter a connecting to others state. During this state, the agent control device may wait for the commander or control module to be available for connection. The method may proceed to block 408, where the method may include connecting the control plane. The method may proceed to block 410, where the method may end. Upon completion of this state, the module state machine may enter a connected state. While connected, the module state machine may perform a variety of functions. It may wait on standby and in the case that the control state machine fails, the module state machine may take over as the control state machine. The module state machine may also disconnect its dataplane from other dataplanes in the case of an error.

Figure 5:
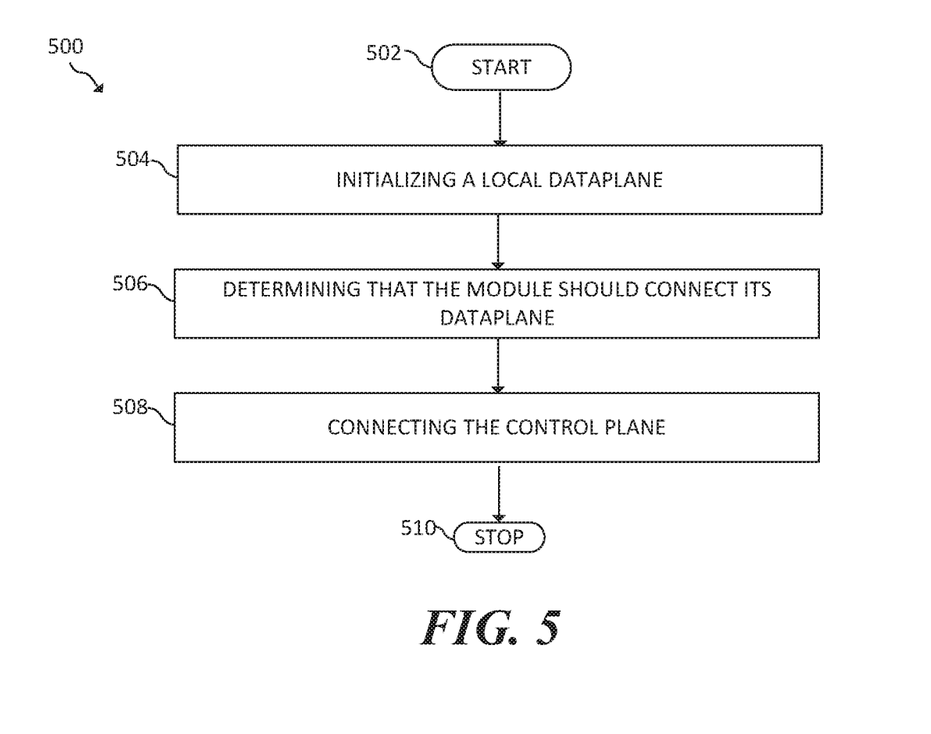
FIG. 5 is a flow diagram of another example method for using state machine communication.

FIG. 5 is a flow diagram of a method 500 for initialization using state machine communication. The system where method 500 is performed may be similar to system 100 described above. Accordingly, parts of and/or the entire method may be performed by, for example, one or more of the agent state machines 120. The method 500 describes the actions performed by the agent state machine when configuring its corresponding module. Each time that the agent state machine changes its state during its process, it may write the change and/or update its state in the database. As described above, the agent state machine runs on the corresponding module, not the control device. The arbiter of the control device maintains a state machine corresponding to each module in the system in order to be aware of the state of that state machine. The control device may also periodically check to make sure that the state of the corresponding module in the module state machine matches the state of the module in the agent state machine. The module state machine may be part of module in communication with a control device running an instance of a Dataplane Setup Engine (DPSE). As described above, in some aspects, the module itself may be the control device.

The method may begin at block 502 and may proceed to block 504 where the method may include initializing a local dataplane of the corresponding module. Once the corresponding module has brought up its basic infrastructure, the agent may enter an uninitialized state. On this state, the agent can perform any action required before initializing the ASIC, any data structure, thread or SDK initialization required. The corresponding module may then enter the initializing state as it is initializing the dataplane and enter an initialized state once the ASIC is initialized. The method may proceed to block 506, where the method may include determining that the corresponding module should connect its managed dataplane to other dataplanes in the system. According, the agent state machine may enter a connecting to others state. The method may proceed to block 508, where the method may include connecting the control plane. The method may proceed to block 510, where the method may end. Upon completion of this method, the agent state machine may enter a connected state. While connected, the agent state machine may perform a variety of functions. It may wait on standby and in the case that the control state machine fails, the agent state machine may take over as the control state machine. The agent state machine may also disconnect its dataplane from other dataplanes in the case of an error.

Figure 6:
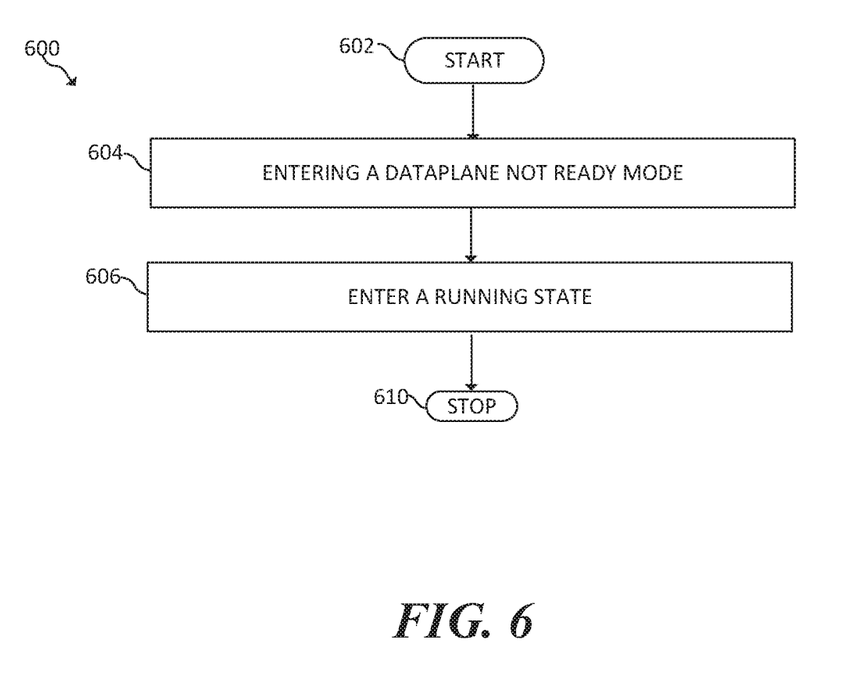
FIG. 6 is a flow diagram of another example method for using state machine communication.

FIG. 6 is a flow diagram of a method 600 for initialization using state machine communication. The system where method 600 is performed may be similar to system 100 described above. Accordingly, parts of and/or the entire method may be performed by, for example, the config state machine 122. The method 600 may be used to configure a corresponding module in the system. The config state machine 122 may be part of a module connected with or part of a control device running an instance of a Dataplane Setup Engine (DPSE). Moreover, each time that the config state machine 122 changes its state, it may write the change and/or update its state in the database.

The method 600 may begin at block 602 and proceed to block 604 where the method may include entering a dataplane not ready mode. The control state machine may remain in this mode until it determines that a dataplane is ready to be updated. The method may proceed to block 606, where the method may include entering a running state, where the module associated with the config state machine 122 is configured to become active. The method may proceed to block 308, where the method may end.

Figure 7:
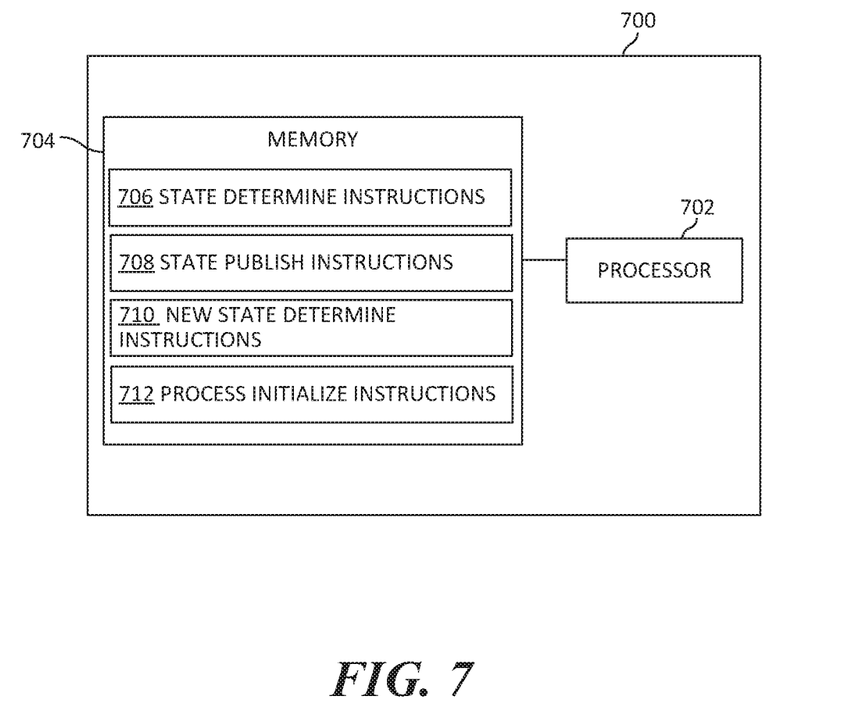
FIG. 7 is a block diagram of an example storage medium storing machine-readable instructions for state machine communication.

FIG. 7 is a block diagram of an example system 700 for state based communication. In the example illustrated in FIG. 7, system 700 includes a processor 702 and a machine-readable storage medium 704. In some aspects, processor 702 and machine-readable storage medium 704 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 702 may be at least one central processing unit (CPU), microprocessor, and/or other hardware devices suitable for retrieval and execution of instructions stored in machine-readable storage medium 704. In the example illustrated in FIG. 7, processor 702 may fetch, decode, and execute instructions 706, 708, 710 and 712. Processor 702 may include at least one electronic circuit comprising a number of electronic components for performing the functionality of at least one of the instructions in machine-readable storage medium 704. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 704 may be any electronic, magnetic, optical, or other physical storage device that stores executable instructions. Thus, machine-readable storage medium 704 may be, for example, Random Access Memory (RAM), an Electrically-Erasable Programmable Read-Only Memory (EEPROM), a storage drive, an optical disc, and the like. Machine-readable storage medium 704 may be disposed within system 700, as shown in FIG. 7. In this situation, the executable instructions may be "installed" on the system 700. Machine-readable storage medium 704 may be a portable, external or remote storage medium, for example, that allows system 700 to download the instructions from the portable/external/remote storage medium. In this situation, the executable instructions may be part of an "installation package". As described herein, machine-readable storage medium 704 may be encoded with executable instructions for context aware data backup. The machine-readable storage medium may be non-transitory.

Referring to FIG. 7, state determine instructions 706, when executed by a processor (e.g., 702), may cause system 700 to determine, by a control state machine running on a control module, a state for a plurality of modules communicatively coupled to the control module. In some aspects, the control state machine runs on a centralized controller does not belong to the plurality of modules. In some aspects, the control state machine runs on a first module belongs to the plurality of modules. Each module may have a corresponding state machine that publishes state information into a centralized database.

Referring to FIG. 7, state publish instructions 706, when executed by a processor (e.g., 702), may cause system 700 to publish, by the control state machine, the target state for each module belonging to the plurality of modules, into the centralized database, wherein each target state is associated with a set of actions to enable the module to achieve the target state. Publishing the target state for a first module belonging to the plurality of modules may be used to indicate that the first module has finished its portion of a configuration sequence. The method may also include determining, by the control state machine, a state of a first module belonging to the plurality of modules, by determining the state of the first module published to the database, wherein the control state machine does not directly communicate with the first module.

Referring to FIG. 7, new state determine instructions 706, when executed by a processor (e.g., 702), may cause system 700 to determine, by the control state machine, that each module belonging to the plurality of modules has published its new state to the database.

Referring to FIG. 7, process initialize instructions 706, when executed by a processor (e.g., 702), may cause system 700 to initialize by the control state machine, a process related to at least one module belonging to the plurality of modules. The process may be, for example, connecting a first dataplane of a first module belonging to the plurality of modules to a dataplane of each other module belonging to the plurality of modules. The processes may include changing a device from a standby mode to an active mode, hardware configuration, communication configuration, rebooting the system, inserting new hardware/software, etc.

The foregoing disclosure describes a number of examples for using state based communication. The disclosed examples may include systems, devices, computer-readable storage media, and methods for using state based communication. For purposes of explanation, certain examples are described with reference to the components illustrated in FIGS. 1A-7. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1A-7 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
   determining, by a control state machine running on a control module, a state for a plurality of modules communicatively coupled to the control module, wherein each module has a corresponding state machine that publishes state information into a centralized database;
   publishing, by the control state machine, the target state for each module belonging to the plurality of modules, into the centralized database, wherein each target state is associated with a set of actions to enable the module to achieve the target state;

determining, by the control state machine, that each module belonging to the plurality of modules has published its new state to the database; and initializing, by the control state machine, a process related to at least one module belonging to the plurality of modules.

2. The method of claim 1 wherein the control state machine runs on a centralized controller does not belong to the plurality of modules.

3. The method of claim 1 wherein the control state machine runs on a first module belongs to the plurality of modules.

4. The method of claim 3 comprising:

determining, by the control state machine of the first module, that an initial control state machine executing on a second module belonging to the plurality of modules has disconnected from the plurality of modules; and determining, by the control state machine, that the control state machine of the first module is to become the control state machine for the plurality of modules.

5. The method of claim 1 wherein the process is connecting a first dataplane of a first module belonging to the plurality of modules to a dataplane of each other module belonging to the plurality of modules.

6. The method of claim 1 wherein publishing the target state for a first module belonging to the plurality of modules indicates that the first module has finished its portion of a configuration sequence.

7. The method of claim 1 comprising:

determining, by the control state machine, a state of a first module belonging to the plurality of modules, by determining the state of the first module published to the database, wherein the control state machine does not directly communicate with the first module.

8. A non-transitory computer-readable storage medium encoded with instructions, the instructions executable by a processor of a system to cause the system to:

determine, by a control state machine running on a control module, a state for a plurality of modules communicatively coupled to the control module, wherein each module has a corresponding state machine that publishes state information into a centralized database;

publish, by the control state machine, the target state for each module belonging to the plurality of modules, into the centralized database, wherein each target state is associated with a set of actions to enable the module to achieve the target state;

determine, by the control state machine, that each module belonging to the plurality of modules has published its new state to the database; and initialize, by the control state machine, a process related to at least one module belonging to the plurality of modules.

9. The non-transitory computer-readable storage medium of claim 8 wherein the control state machine runs on a centralized controller does not belong to the plurality of modules.

10. The non-transitory computer-readable storage medium of claim 8 wherein the control state machine runs on a first module belongs to the plurality of modules.

11. The non-transitory computer-readable storage medium of claim 10, wherein the instructions executable by the processor cause the system to:

determine that an initial control state machine executing on a second module belonging to the plurality of modules has disconnected from the plurality of modules; and determine that the control state machine of the first module is to become the control state machine for the plurality of modules.

12. The non-transitory computer-readable storage medium of claim 8 wherein the process is connecting a first dataplane of a first module belonging to the plurality of modules to a dataplane of each other module belonging to the plurality of modules.

13. The non-transitory computer-readable storage medium of claim 8 wherein publishing the target state for a first module belonging to the plurality of modules indicates that the first module has finished its portion of a configuration sequence.

14. The non-transitory computer-readable storage medium of claim 8, wherein the instructions executable by the processor cause the system to:

determine a state of a first module belonging to the plurality of modules, by determining the state of the first module published to the database, wherein the control state machine does not directly communicate with the first module.

15. A system comprising:

a state determiner to determine a state for a plurality of modules communicatively coupled to the control module, wherein each module has a corresponding state machine that publishes state information into a centralized database;

a state publisher to publish the target state for each module belonging to the plurality of modules, into the centralized database, wherein each target state is associated with a set of actions to enable the module to achieve the target state;

a new state determiner to determine that each module belonging to the plurality of modules has published its new state to the database; and a process initializer to initialize a process related to at least one module belonging to the plurality of modules.

16. The system of claim 15 wherein the control state machine runs on a first module belongs to the plurality of modules.

17. The system of claim 16 comprising:

the state determiner to determine that an initial control state machine executing on a second module belonging to the plurality of modules has disconnected from the plurality of modules; and the state determiner to determine that the control state machine of the first module is to become the control state machine for the plurality of modules.

18. The system of claim 15 comprising:

the state determiner to determine a state of a first module belonging to the plurality of modules, by determining the state of the first module published to the database, wherein the control state machine does not directly communicate with the first module.

19. The system of claim 15 wherein the process is connecting a first dataplane of a first module belonging to the plurality of modules to a dataplane of each other module belonging to the plurality of modules.

20. The system of claim 15 wherein publishing the target state for a first module belonging to the plurality of modules indicates that the first module has finished its portion of a configuration sequence.

* * * * *